US010600085B2

(12) United States Patent
Rodriguez

(10) Patent No.: US 10,600,085 B2
(45) Date of Patent: Mar. 24, 2020

(54) SYSTEMS AND METHODS FOR COMMUNICATING PRIVACY AND MARKETING PREFERENCES

(71) Applicant: Alan Rodriguez, Southlake, TX (US)

(72) Inventor: Alan Rodriguez, Dallas, TX (US)

( * ) Notice: Subject to any disclaimer, the term of this patent is extended or adjusted under 35 U.S.C. 154(b) by 684 days.

(21) Appl. No.: 14/714,001

(22) Filed: May 15, 2015

(65) Prior Publication Data

US 2016/0027052 A1 Jan. 28, 2016

Related U.S. Application Data

(60) Provisional application No. 61/994,116, filed on May 15, 2014.

(51) Int. Cl.
*G06Q 30/00* (2012.01)
*G06Q 30/02* (2012.01)

(52) U.S. Cl.
CPC ................ *G06Q 30/0257* (2013.01)

(58) Field of Classification Search
None
See application file for complete search history.

(56) References Cited

U.S. PATENT DOCUMENTS

2002/0026394 A1* 2/2002 Savage ................ G06Q 20/02
705/34
2009/0254511 A1* 10/2009 Yeap ................. G06F 21/6245

2013/0332362 A1* 12/2013 Ciurea ................ G06Q 20/383
705/44
2014/0310788 A1* 10/2014 Ricci ................ G06F 16/583
726/6
2014/0344015 A1* 11/2014 Puertolas-Montanes ...................
G06Q 20/10
705/7.29

FOREIGN PATENT DOCUMENTS

JP 2001101274 A * 4/2001 ............. G06F 17/60
WO WO-2010027517 A2 * 3/2010 ......... G06F 21/6254

OTHER PUBLICATIONS

Shinseki et al. Department of the Army Information Security Program. (Sep. 29, 2000). Retrieved online Nov. 9, 2019. https://fas.org/irp/doddir/army/ar380-5.pdf (Year: 2000).*
Department of Homeland Security. Safeguarding Sensitive But Unclassified (for Official Use Only) Information. Jan. 6, 2005. https://www.dhs.gov/xlibrary/assets/foia/mgmt_directive_110421_safeguarding_sensitive_but_unclassified_information.pdf(Year: 2005).*

* cited by examiner

*Primary Examiner* — James A Reagan

(57) ABSTRACT

Systems and methods of managing and communicating privacy and marketing preferences are described. In particular, a system for managing and communicating comprises a central user preference center that is configured to store at least one privacy and marketing preference dataset of a user in association with account information identifying an account of the user. The central preference center is configured to publish at least one privacy and marketing preference dataset of a user to at least one entity preference center, and the at least one entity preference center is configured to communicate the user's entity preference center privacy and marketing preference dataset to the central user preference center.

16 Claims, 5 Drawing Sheets

SYSTEMS AND METHODS FOR COMMUNICATING PRIVACY AND MARKETING PREFERENCES

The present application claims the benefit of U.S. Provisional Application Ser. No. 61/994,116, entitled "SYSTEMS AND METHODS FOR COMMUNICATING PRIVACY AND MARKETING PREFERENCES", filed May 15, 2014, which is incorporated herein by reference.

BACKGROUND

The principles of "notice and choice" have been the key principles of information privacy protection for several decades. These principles of privacy that involve the notion of individual control require sufficient mechanisms for individuals to understand where, when and under what conditions their personal information may be used and transferred and to exercise control over data usage and transference. Therefore, the various sets of fair information practice principles and privacy laws based on these practices include requirements for providing notice about data practices and allowing individuals to exercise control over those practices. Privacy policies and preference center based opt-out mechanisms have become the predominant tools for notice and choice. However, these tools are increasingly insufficient. Serious threats follow from the ease of information storage, transfer, aggregation, analysis and inference. We face the real risk that the technological laws spelled out by Gordon Moore (growth in processing power) and Robert Metcalfe (network effects) will permanently overwhelm existing privacy principles of notice and choice. Privacy policies are long, complicated, inconsistently structured and subject to frequent and unannounced change. Digital services often involve interactions and data exchanges that include third parties unknown to the end user. Each digital service requires specific and tailored advertising preferences selections and can change these choices and associated user selections at any time. In this environment, it is nearly impossible for individuals to control their information usage or related third-party data flows via existing privacy policies and preference center based opt-out mechanism tools for notice and choice.

The inherently decentralized nature of the internet, being comprised of a multitude of digital services each with its own—advertising preference choices and privacy policies, does not permit acceptable transparency for individuals to understand where, when and under what conditions their personal information may be used and transferred or to exercise control over data usage and transference or to hold digital services and their third party partners accountable for unanticipated and unapproved data usage.

SUMMARY

The disclosure is directed to systems and methods of communicating privacy and marketing preferences in accordance with some embodiments of the invention. In particular, the disclosure is directed to a computing apparatus having at least one microprocessor and memory storing instructions configured to instruct the at least one microprocessor to perform operations. The operations comprise a central user preference center that is configured to store at least one privacy and marketing preference dataset of a user in association with account information identifying an account of the user. The central user preference center is configured to publish at least one privacy and marketing preference dataset of a user to the at least one entity preference center, and the at least one entity preference center is configured to communicate the user's entity preference center privacy and marketing preference dataset to the central preference center.

The disclosure is also directed to a computer-implemented method. The method comprises storing, in a computing apparatus, data representing a privacy and marketing preferences dataset of a user. It further comprises the step of communicating, by the computing apparatus, the privacy and marketing preferences dataset of the user to an entity in response to an interaction between the user and the computing apparatus or the entity, where the entity stores data about the user and the privacy and marketing preferences dataset controls storage and usage of the data about the user. The method further comprises the step of providing, by the computing apparatus, a communication channel between the user and the entity to customize the privacy and marketing preferences dataset of the user for the data about the user stored by the entity.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

In view of the challenges associated with decentralized control of privacy preferences, there exists a need to enable online consumers to manage their privacy and marketing preferences across multiple platforms and entity preference centers.

Accordingly, the present disclosure provides systems and methods of communicating privacy and marketing preferences. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
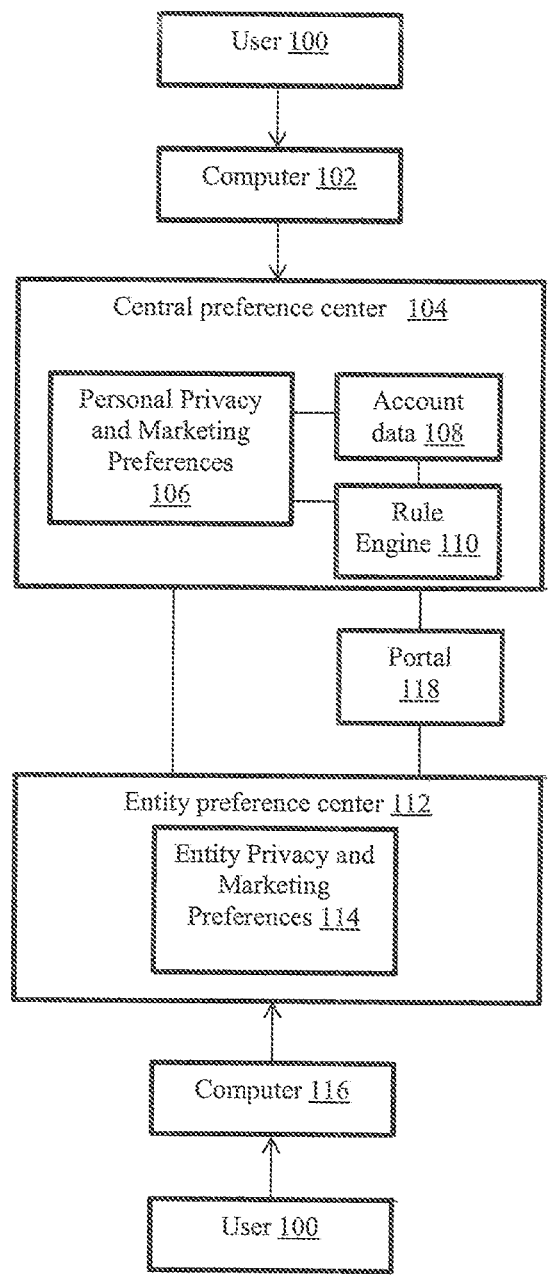
FIG. 1 shows a system to communicating privacy preferences in accordance with some embodiments of the invention.

FIG. 1 shows a system for communicating personal privacy and marketing preferences according to one embodiment. In FIG. 1, the system includes a computer 102 for a user 100 to enter personal privacy and marketing preferences and additional user associated information into a central preference center 104. The central preference center (CPC) is configured to store a user's privacy and marketing preferences or dataset 106. As used herein, "central preference center" or "CPC" refers to a database, server, network, application, etc., that is configured to store, manage, and communicate a user's privacy and/or marketing preferences. The CPC 106 also stores the user's account data or information 108 that may be associated with the user's privacy and marketing preferences 106.

In some embodiments, the CPC 104 is coupled to a rule engine 110 configured to compare the user's CPC preference dataset to the user's entity privacy and marketing preferences 114. The user's entity preferences dataset 114 may be received from entity preference center 112, which the user 100 may optionally have managed separately via computer 116. As used herein, "entity preference center" refers to a preference center other than the central preference center and includes, but is not limited to, preference centers under the control of, or affiliated with, commercial or non-commercial entities.

In some embodiments, a portal 118 is configured to receive, transmit, process, manage and/or store the user's CPC preferences and the user's entity preference center preferences. The portal may be implemented as a web portal, a telephone gateway, a file/data server, etc. The portal may be operated by a trusted entity or by the user. In some embodiments the portal is not implemented via a web browser.

Figure 2:
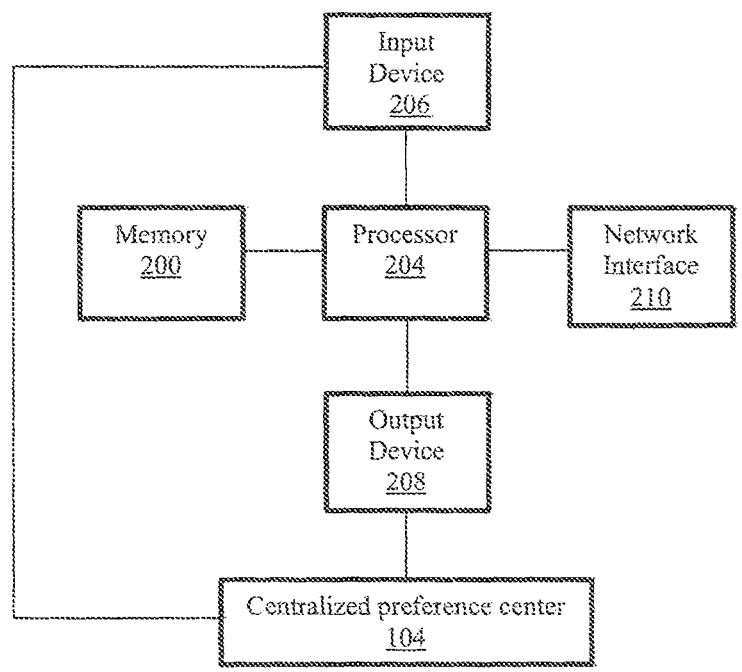
FIG. 2 is a block diagram of an illustrative electronic device for user management of personal privacy and marketing data in accordance with some embodiments of the invention.

FIG. 2 shows a block diagram of an illustrative electronic device 102 or 116 for user management of personal privacy and marketing data 106 or 114 according to one embodiment. In FIG. 2, the device or computer 102 or 116 includes a memory 200 coupled to a processor 204, which controls the operations of an input device 206, an output device 208 and a network interface 210 such as wired or wireless modem with the internet and specifically with one or more remote servers, for example, the CPC 104 servers having server processors accessing a server storage medium on which is stored the user's personal privacy and marketing preferences and logic in accordance with present principles. The memory 200 may store instructions for the processor and/or data.

In one embodiment, the input device 206 includes key buttons that can be used to enter preferences and account information.

In one embodiment, the output device 208 may include a display, a speaker, and/or a printer.

In one embodiment, the network interface 210 is configured to communicate with the CPC 104 via a telephone connection, an Internet connection, or other data communication channel.

In one embodiment, the computer or device 102 or 116 may be a non-portable computing device or a portable computing device. The computing device permits the user to input, manage and receive data from the CPC.

Examples of non-portable consumer devices include a computer terminal, a television set, a personal computer, medical devices, robotic devices, data sensors, a set-top box, a thermostat, or the like. Examples of portable consumer devices include a portable computer, a cellular phone, a personal digital assistant (PDA), a tablet, a Google glasses, wearable computing devices, an automobile computer, wearable medical devices, or the like, for example, as illustrated in FIG. 3.

Figure 3:
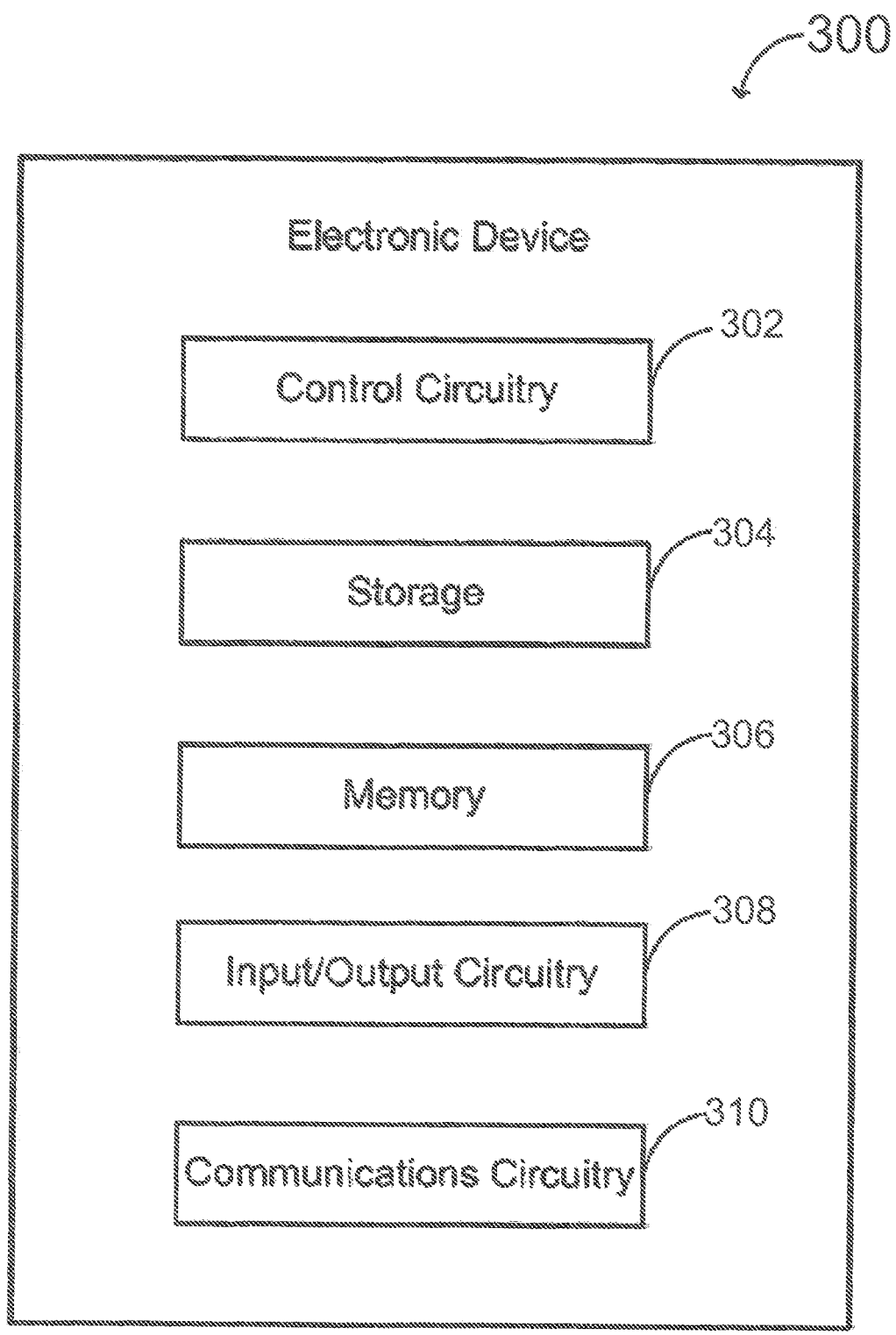
FIG. 3 is a block diagram of an illustrative but not limiting electronic device for communicating personal privacy and marketing preferences in accordance with some embodiments of the invention.

FIG. 3 is a block diagram of an illustrative but not limiting electronic device for communicating personal privacy and marketing preferences in accordance with some embodiments of the invention. Electronic device 300 can include control circuitry 302, storage 304, memory 306, input/output ("I/O") circuitry 308, and communications circuitry 310. In some embodiments, one or more of the components of electronic device 300 can be combined or omitted (e.g., storage 304 and memory 306 may be combined). In some embodiments, electronic device 300 can include other components not combined or included in those shown in FIG. 3 (e.g., motion detection components, a power supply such as a battery or kinetics, a display, bus, a positioning system, a camera, an input mechanism, etc.), or several instances of the components shown in FIG. 3. For the sake of simplicity, only one of each of the components is shown in FIG. 3.

Electronic device 300 can include any suitable type of electronic device. For example, electronic device 300 can include a portable electronic device that the user may hold in his or her hand, such as a smartphone (e.g., an iPhone made available by Apple Inc. of Cupertino, Calif. or an Android device such as those produced and sold by Samsung). As another example, electronic device 300 can include a larger portable electronic device, such as a tablet or laptop computer. As yet another example, electronic device 300 can include a substantially fixed electronic device, such as a desktop computer.

Control circuitry 302 can include any processing circuitry or processor operative to control the operations and performance of electronic device 300. For example, control circuitry 302 can be used to run operating system applications, firmware applications, media playback applications, media editing applications, or any other application. In some embodiments, control circuitry 302 can drive a display and process inputs received from a user interface.

Storage 304 can include, for example, one or more storage mediums including a hard-drive, solid state drive, flash memory, permanent memory such as ROM, any other suitable type of storage component, or any combination thereof. Storage 304 can store, for example, media data (e.g., music and video files), application data (e.g., for implementing functions on electronic device 300), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 300 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 306 can include cache memory, semi-permanent memory such as RAM, and/or one or more different types of memory used for temporarily storing data. In some embodiments, memory 306 can also be used for storing data used to operate electronic device applications, or any other type of data that can be stored in storage 304. In some embodiments, memory 306 and storage 304 can be combined as a single storage medium.

I/O circuitry 308 can be operative to convert (and encode/decode, if necessary) analog signals and other signals into digital data. In some embodiments, I/O circuitry 308 can also convert digital data into any other type of signal, and vice-versa. For example, I/O circuitry 308 can receive and convert physical contact inputs (e.g., from a multi-touch screen), physical movements (e.g., from a mouse or sensor), analog audio signals (e.g., from a microphone), or any other input. The digital data can be provided to and received from control circuitry 302, storage 304, memory 306, or any other component of electronic device 300. Although I/O circuitry 308 is illustrated in FIG. 3 as a single component of electronic device 300, several instances of I/O circuitry 308 can be included in electronic device 300.

Electronic device 300 can include any suitable interface or component for allowing a user to provide inputs to I/O circuitry 308. For example, electronic device 300 can include any suitable input mechanism, such as for example, a button, keypad, dial, a click wheel, or a touch screen. In some embodiments, electronic device 300 can include a capacitive sensing mechanism, or a multi-touch capacitive sensing mechanism.

In some embodiments, electronic device 300 can include specialized output circuitry associated with output devices such as, for example, one or more audio outputs. The audio output can include one or more speakers (e.g., mono or stereo speakers) built into electronic device 300, or an audio component that is remotely coupled to electronic device 300 (e.g., a headset, headphones or earbuds that can be coupled to communications device with a wire or wirelessly).

In some embodiments, I/O circuitry 308 can include display circuitry (e.g., a screen or projection system) for providing a display visible to the user. For example, the display circuitry can include a screen (e.g., an LCD screen) that is incorporated in electronics device 300. As another example, the display circuitry can include a movable display or a projecting system for providing a display of content on a surface (e.g., optical displays, including head mounted displays such as digital contact lenses and eye glasses) remote from electronic device 300 (e.g., a video projector). In some embodiments, the display circuitry can include a coder/decoder (CODEC) to convert digital media data into analog signals. For example, the display circuitry (or other appropriate circuitry within electronic device 200) can include video CODECs, audio CODECs, or any other suitable type of CODEC.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 302. Alternatively, the display circuitry can be operative to provide instructions to a remote display.

Communications circuitry 310 can include any suitable communications circuitry operative to connect to a communications network and to transmit communications (e.g., voice or data) from electronic device 300 to other devices within the communications network. Communications circuitry 310 can be operative to interface with the communications network using any suitable communications protocol such as, for example, Wi-Fi (e.g., a 802.11 protocol), Bluetooth, radio frequency systems (e.g., 900 MHz, 1.4 GHz, and 5.6 GHz communication systems), infrared, GSM, GSM plus EDGE, CDMA, LTE and other cellular protocols, VOIP, TCP/IP, Ethernet, and the like.

In some embodiments, communications circuitry 310 can be operative to create a communications network using any suitable communications protocol. For example, communications circuitry 310 can create a short-range communications network using a short-range communications protocol to connect to other devices. For example, communications circuitry 310 can be operative to create a local communications network using the Bluetooth protocol to couple electronic device 300 with a Bluetooth headset.

Electronic device 300 can include one more instances of communications circuitry 310 for simultaneously performing several communications operations using different communications networks, although only one is shown in FIG. 3 to avoid overcomplicating the drawing. For example, electronic device 300 can include a first instance of communications circuitry 310 for communicating over a cellular network, and a second instance of communications circuitry 310 for communicating over Wi-Fi or using Bluetooth. In some embodiments, the same instance of communications circuitry 310 can be operative to provide for communications over several communications networks.

In some embodiments, electronic device 300 can be coupled to a host device for data transfers, synching the communications device, software or firmware updates, providing performance information to a remote source (e.g., providing riding characteristics to a remote server) or performing any other suitable operation that can require electronic device 300 to be coupled to a host device. Several electronic devices 300 can be coupled to a single host device using the host device as a server. Alternatively or additionally, electronic device 300 can be coupled to several host devices (e.g., for each of the plurality of the host devices to serve as a backup for data stored in electronic device 300).

Figure 4:
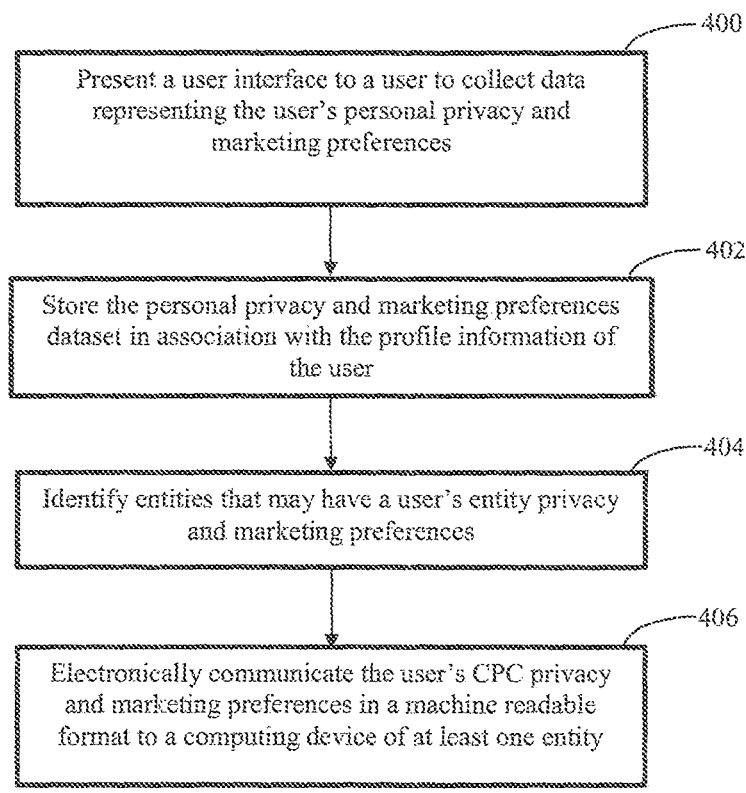
FIG. 4 shows a method of managing personal privacy and marketing data in accordance with some embodiments of the invention.

At step 400 in FIG. 4, the user accesses the CPC and accesses the user's account data 108. In one embodiment, a user interface is provided to serve as a "personal privacy and marketing control panel," where individual users record their preferences with instructions on how the users would like their data to be used. In one embodiment, the user may specify which preferences may be shared with which preference centers or entities, for instance, by identifying categories of entities. For example, the control panel can include broad categories of entities that the user may be similar privacy and marketing preferences, such as social networking (e.g., Instagram, Pinterest, Facebook, Tumblr, Twitter); business networking (e.g., LinkedIn); money management entities (e.g., Fidelity, American Funds, Schwab, Scottrade, TD Ameritrade, T. Rowe Price, Vanguard, etc.); banking entities (e.g., American Express, Bank of America, Barclays, Capital One, Chase, Wells Fargo, USAA, etc.); stores and commerce entities (e.g., Apple, Amazon, Ebay, Groupon, PayPal, Target, Walmart, etc.); email providers (Google, Microsoft, Yahoo); media and entertainment entities (Flickr, Hulu, Minecraft, Pandora, Netflix, SoundCloud, YouTube, Match.com, E-Harmony, etc.); government and tax entities (e.g., H&R Block, Intuit, etc.; and miscellaneous entities (Dropbox, GitHub, Wordpress, etc.).

In general, users may manage their privacy preferences that cover the following uses: temporal, spatial, functional, identity, social, tracking and aggregation. An illustrative example of a temporal use is when the entity can collect and use data from the user. An illustrative example of a spatial use is where can the entity collect data about the user. An illustrative example of a functional use concerns how the entity can collect and use information about the user. An illustrative example of an identity use is what persona (including anonymous) is the user when the entity interacts with the user. An illustrative example of a social use is regarding who the entity can share information about the user. An illustrative example of tracking use is where the user can opt-in for online activity tracking. An illustrative example of aggregation use controls with whom the entity can aggregate user data.

Regarding social networking sites, privacy preferences may also include who can see the user's posts, whether the user would like to review posts that the user is tagged in, whether the user would like to limit the audience for the user's posts that have been shared by friends, who can send the user friend requests or messages, whether the user would like to include their email address and/or phone number with their preference dataset, whether the user would like to have their posts linked to a search engine, posting permissions for others regarding the user's timeline, whether to share location information (i.e., location "check-in" by default or not), etc. Privacy settings may also include security settings, and the user may select privacy/security preferences that include login notifications, verification preferences such as by using the user's phone number or text to verify account access, etc.

For example regarding business networking sites, privacy preferences may include whether and with whom activity broadcasts may be shared, who can see the user's activity feed, who can view connections, what can be viewed on the user's personal or public profiles, and to select people to block by default, etc.

For example regarding money management or banking preference centers, the user may select whether to permit sharing of information with affiliates and non-affiliates or the money manager or bank, storage of cookies, flash cookies (i.e., LSOs), etc.

In one embodiment, the "personal privacy and marketing control panel" provides pre-labeled or pre-populated fields that may be marked by the user to reflect their privacy and marketing preferences. For example, a set of baseline marketing and privacy preferences for different types of entities may be provided.

In one embodiment, the personal privacy and marketing preferences datasets of a user are stored and shareable in a standardized format.

At step 402, the personal privacy and marketing preferences data is stored in association with the preference dataset of the user.

In one embodiment, the user may store multiple policies in association with their account information, with each preference dataset being appropriate for the category which the entity is a member, e.g., social networking, media and entertainment, business networking, etc.

In one embodiment, at least 1, 2, 4, 6, 8, 10, 12, 14, 16, 18, 20 or more preference datasets may be created. In one embodiment, at least one preference dataset is created for each preference center. In one embodiment, the control panel permits the user to duplicate a preference dataset. In one embodiment the duplicated preference dataset may be edited to change the user's privacy and marketing preferences. The preference datasets may be saved separately with unique names or titles that may reflect, for example, the website, preference center, and/or entity for intended use.

At step 404, the user identifies from a list of common entities such those identified above, among others, and can further add the name of an entity preference center or website with which the user has an account to a searchable field. In one embodiment, the CPC maintains a database of entity preference centers and/or websites with which a user may have an account. The CPC may alternatively perform a search of the internet to identify the entity preference centers and/or websites and send a query to the entity preference centers and/or websites asking if a user has a preference dataset matching the account information recorded with the CPC.

In one embodiment, the CPC or perhaps specifically within the control panel, a user may identify settings by which the preference dataset may be communicated to the entity preference center or website.

At step 406, the CPC electronically communicates or publishes the privacy and marketing preferences of the user in a machine readable format to a computing device of at least one entity preference center. In one embodiment, electronic communication of the privacy and marketing preferences of the user is automatic upon saving of the preference dataset or within a set period of time after the preference dataset is saved, continuously, or at set intervals as determined by the user or by the authority controlling the CPC. In one embodiment, electronic communication of the privacy and marketing preferences of the user to the entity preference center or website is via secure internet connection.

Figure 5:
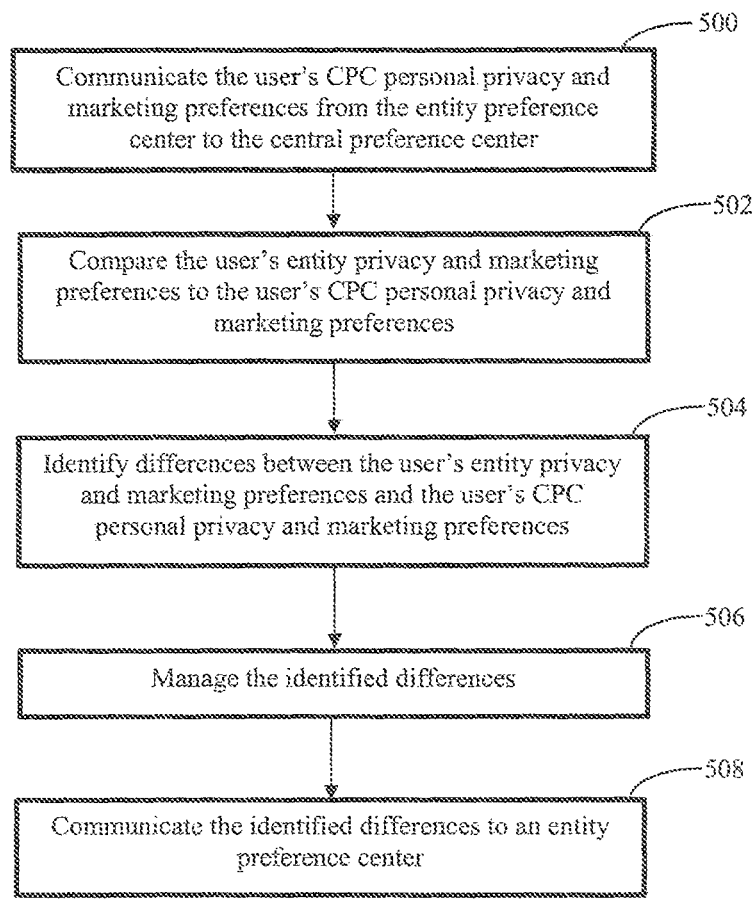
FIG. 5 shows a method of managing personal privacy and marketing data in accordance with some embodiments of the invention.

FIG. 5 shows a method of managing personal privacy and marketing data. In FIG. 5, as shown in step 500, in one embodiment, a computer apparatus of the CPC is configured to communicate with an application or computing apparatus of an entity preference center or website in order to retrieve the user's privacy and marketing preferences from the entity preference center or website.

In one embodiment, a computing apparatus of an entity preference center or website 112 is configured to communicate with a computer apparatus of the CPC and sends/aggregates the user's existing privacy and marketing preferences to the CPC.

At step 502, the user's entity preference center or website's existing privacy and marketing preferences are received by the CPC. In one embodiment, the user's entity preferences dataset 114 is compared to the user's personal privacy and marketing preferences dataset 106 via a rule engine 110, see FIG. 1.

At step 504, the rule engine 110 is configured to identify differences between the entity preference center preferences dataset 114 and CPC preferences dataset 106.

At step 506, the user may manage or reconciliate differences identified by the rule engine 110, for instance, by permitting the user to accept the changes to the user's corresponding CPC personal privacy and marketing preferences 106. In another embodiment, the user has the option (e.g., through the control panel), to apply and optionally save accepted changes to other preference datasets or globally across all preference datasets associated with the user's account.

At step 508, the updated preference datasets may be re-published to the entity preference center, substantially or identically as described by step 406 above.

The processes discussed above are intended to be illustrative and not limiting. Persons skilled in the art will appreciate that steps of the process discussed herein can be omitted, modified, combined, or rearranged, and any additional steps can be performed without departing from the scope of the invention.

The application can be implemented by software, but can also be implemented in hardware or a combination of hardware and software. The invention can also be embodied as computer-readable code on a computer-readable medium. The computer-readable medium can include any data storage device that can store data which can thereafter be read by a computer system. Examples of the computer readable medium include read-only memory ("ROM"), random-access memory ("RAM"), CD-ROMs, DVDs, magnetic tape, optical data storage device, flash storage devices, or any other suitable storage devices. The computer-readable medium can also be distributed over network coupled computer systems.

Insubstantial changes from the claimed subject matter as viewed by a person with ordinary skill in the art, now known or later devised, are expressly contemplated as being equivalently within the scope of this disclosure. Therefore, obvious substitutions now or later known to one with ordinary skill in the art are defined to be within the scope of the defined elements.

The above-described embodiments of the present invention are presented for purposes of illustration and not of limitation.

What is claimed is:

1. A system for managing settings across multiple platforms, comprising:
    a server configured to store at least one privacy and marketing preference dataset of a user in association with account information identifying an account of the user, wherein the at least one privacy and marketing preference dataset includes privacy and marketing preferences from a plurality of websites, and wherein the server includes:
        a database configured to identify each of the plurality of websites with which the user has an account; and
        a rule engine configured to:
            connect, through a web portal, to one or more remote computing systems associated with one or more of the plurality of websites, wherein the one or more remote computing systems store user privacy and marketing preference settings associated with the one or more of the plurality of web sites;
            identify differences between the at least one privacy and marketing preference dataset of the user with the user privacy and marketing preference settings associated with the one or more of the plurality of websites; and
            reconcile the differences between the at least one privacy and marketing preference dataset of the user with the user privacy and marketing preference settings associated with the one or more of the plurality of websites, including:
                updating the at least one privacy and marketing preference dataset of the user stored on the server with the user privacy and marketing preference settings associated with the one or more of the plurality of websites based on the reconciled differences; and
                applying the updated at least one privacy and marketing preference dataset of the user globally across the plurality of websites; and
    wherein the server is further configured to:
        based on the at least one privacy and marketing preference dataset, control communication with the user by third-party systems, including determining third-party access to user information based on a website type of at least one of the plurality of websites, wherein the website type of one of the plurality of websites is a money management type, and
        based on the at least one privacy and marketing preference dataset, perform:
            blocking sharing of information with other entities; and
            managing storage of cookies.

2. The system of claim 1, wherein applying the updated at least one privacy and marketing preference dataset of the user globally across the plurality of websites includes providing the at least one privacy and marketing preference dataset in a machine readable format readable by at least one of the one or more remote computing systems.

3. The system of claim 1, wherein applying the updated at least one privacy and marketing preference dataset of the user globally across the plurality of websites is performed at set intervals.

4. The system of claim 1, wherein the website type of one of the plurality of websites is a social networking type, and wherein the server is further configured to, based on the at least one privacy and marketing preference dataset, perform at least one of:
    controlling viewability of social media posts of the user;
    limiting access to personal information of the user;
    linking social networking posts of the user to a search engine;
    controlling sharing of user location information; or
    controlling transmission of login notifications.

5. The system of claim 1, wherein the website type of one of the plurality of websites is a business networking type, and wherein the server is further configured to, based on the at least one privacy and marketing preference dataset, perform at least one of:
    controlling sharing of activity broadcasts of the user;
    controlling viewability of a profile of the user; or
    selecting other users to block by default.

6. The system of claim 1, wherein the at least one privacy and marketing preference dataset of the user is divided into categories.

7. The system of claim 6, wherein the categories include social networking, media and entertainment, or business networking.

8. The system of claim 1, wherein the at least one privacy and marketing preference dataset of the user is divided into a plurality of preference datasets.

9. A method for managing settings across multiple platforms, comprising:
    storing, by a server, at least one privacy and marketing preference dataset of a user in association with account information identifying an account of the user, wherein the at least one privacy and marketing preference dataset includes privacy and marketing preferences from a plurality of web sites;
    identifying, by a database included on the server, each of the plurality of websites with which the user has an account;
    connecting, by a rules engine and through a web portal, to one or more remote computing systems associated with one or more of the plurality of websites, wherein the one or more remote computing systems store user privacy and marketing preference settings associated with the one or more of the plurality of websites;

identifying, by the rules engine, differences between the at least one privacy and marketing preference dataset of the user with the user privacy and marketing preference settings associated with the one or more of the plurality of web sites; and reconciling, by the rules engine, the differences between the at least one privacy and marketing preference dataset of the user with the user privacy and marketing preference settings associated with the one or more of the plurality of websites, including:

updating, by the rules engine, the at least one privacy and marketing preference dataset of the user stored on the server with the user privacy and marketing preference settings associated with the one or more of the plurality of websites based on the reconciled differences; and applying, by the rules engine, the updated at least one privacy and marketing preference dataset of the user globally across the plurality of websites; and controlling, by the server, communication with the user by third-party systems, based on the at least one privacy and marketing preference dataset, including determining third-party access to user information based on a website type of at least one of the plurality of websites, wherein the website type of one of the plurality of websites is a money management type, performing, based on the at least one privacy and marketing preference dataset:
blocking sharing of information with other entities; and
managing storage of cookies.

10. The method of claim 9, wherein applying the updated at least one privacy and marketing preference dataset of the user globally across the plurality of websites includes providing the at least one privacy and marketing preference dataset in a machine readable format readable by at least one of the one or more remote computing systems.

11. The method of claim 9, wherein applying the updated at least one privacy and marketing preference dataset of the user globally across the plurality of websites is performed at set intervals.

12. The method of claim 9, wherein the website type of one of the plurality of websites is a social networking type, and the method further comprising performing, based on the at least one privacy and marketing preference dataset, at least one of:
controlling viewability of social media posts of the user;
limiting access to personal information of the user;
linking social networking posts of the user to a search engine;
controlling sharing of user location information; or
controlling transmission of login notifications.

13. The method of claim 9, wherein the website type of one of the plurality of websites is a social networking type, and the method further comprising performing, based on the at least one privacy and marketing preference dataset, at least one of:
controlling sharing of activity broadcasts of the user;
controlling viewability of a profile of the user; or
selecting other users to block by default.

14. The method of claim 9, wherein the at least one privacy and marketing preference dataset of the user is divided into categories.

15. The method of claim 14, wherein the categories include social networking, media and entertainment, or business networking.

16. The method of claim 9, wherein the at least one privacy and marketing preference dataset of the user is divided into a plurality of preference datasets.

* * * * *